United States Patent
Kliegman et al.

(10) Patent No.: US 8,392,954 B2
(45) Date of Patent: Mar. 5, 2013

(54) METHOD AND SYSTEM FOR DELIVERING PERSONAL MEDIA OVER CABLE TELEVISION

(75) Inventors: Jonathan F. Kliegman, San Francisco, CA (US); Gianluca Macciocca, San Francisco, CA (US); David M. Parrish, San Francisco, CA (US); John M. Paul, Palo Alto, CA (US)

(73) Assignee: Sonic Solutions, Novato, CA (US)

( * ) Notice: Subject to any disclaimer, the term of this patent is extended or adjusted under 35 U.S.C. 154(b) by 269 days.

(21) Appl. No.: 11/779,806

(22) Filed: Jul. 18, 2007

(65) Prior Publication Data

US 2009/0025045 A1 Jan. 22, 2009

(51) Int. Cl.
*H04N 7/173* (2011.01)

(52) U.S. Cl. ........... 725/87; 709/207; 709/227; 709/228

(58) Field of Classification Search .................... 725/87; 709/203, 227, 228
See application file for complete search history.

(56) References Cited

U.S. PATENT DOCUMENTS

| | | | |
|---|---|---|---|
| 6,698,020 B1 * | 2/2004 | Zigmond et al. | 725/34 |
| 6,804,295 B1 | 10/2004 | Belknap | |
| 2002/0056123 A1 * | 5/2002 | Liwerant et al. | 725/87 |
| 2002/0104083 A1 * | 8/2002 | Hendricks et al. | 725/34 |
| 2003/0056218 A1 * | 3/2003 | Wingard et al. | 725/46 |
| 2006/0048185 A1 * | 3/2006 | Alterman | 725/45 |
| 2006/0123455 A1 | 6/2006 | Pai et al. | |
| 2006/0167903 A1 | 7/2006 | Smith et al. | |
| 2007/0220580 A1 * | 9/2007 | Putterman et al. | 725/134 |
| 2007/0226765 A1 * | 9/2007 | Bahnck et al. | 725/63 |
| 2007/0266023 A1 * | 11/2007 | McAllister et al. | 707/6 |
| 2008/0092181 A1 * | 4/2008 | Britt | 725/87 |
| 2008/0178234 A1 * | 7/2008 | Eyal et al. | 725/91 |
| 2008/0189750 A1 * | 8/2008 | Yoon et al. | 725/105 |

FOREIGN PATENT DOCUMENTS

JP 2007-065904 3/2007

* cited by examiner

*Primary Examiner* — Brian Pendleton
*Assistant Examiner* — Olugbenga Idowu
(74) *Attorney, Agent, or Firm* — Schwegman Lundberg & Woessner, P.A.

(57) ABSTRACT

A method and system for delivering personal media over cable television have been disclosed. According to one embodiment, a computer implemented method comprises storing digital content, the digital content including digital photographs, digital video, and music. The digital content is queued for review. A photo show is generated from the digital content. The photo show is transmitted to a cable system for transmission on a video on demand system.

12 Claims, 4 Drawing Sheets

METHOD AND SYSTEM FOR DELIVERING PERSONAL MEDIA OVER CABLE TELEVISION

TECHNICAL FIELD

The field of the invention relates generally to computer systems and more particularly relates to a method and system for delivering personal media over cable television.

BACKGROUND

For many years, people have collected photographs and placed them in physical albums in order to preserve and share them with other people. In recent years, with the advent of digital photography, photographs are taken and stored on personal computers and other storage devices. Digital photographs can be burned onto DVDs and CD-ROMs and shared with others.

Many digital cameras allow users to connect the camera to a television to display the digital photographs stored in the camera. Some services, such as those offered by KODAK, allow people to receive CD-ROMs with digital images stored on them, whether taken with a digital camera or a film based camera. In addition, some DVD players could read DVDs and CD-ROMs such that digital photo albums can be watched on a television.

Even more recently, technology has been developed that allows digital photographs to be uploaded to servers on the Internet and shared with other people. Websites such as OFOTO, FLICKR, SHARPCAST, and SNAPFISH have provided various ways to organize and collect digital photographs.

Digital photography has also become more and more ubiquitous in that mobile phones and other handheld devices are being sold with integrated digital cameras. Accordingly, more and more photographic content is available in digital form for which new distribution mechanisms need be developed.

SUMMARY

A method and system for delivering personal media over cable television are disclosed. According to one embodiment, a computer implemented method comprises storing digital content, the digital content including digital photographs, digital video, and music. The digital content is queued for review. A photo show is generated from the digital content. The photo show is transmitted to a cable system for transmission on a video on demand system.

The above and other preferred features, including various novel details of implementation and combination of elements, will now be more particularly described with reference to the accompanying drawings and pointed out in the claims. It will be understood that the particular methods and systems described herein are shown by way of illustration only and not as limitations. As will be understood by those skilled in the art, the principles and features described herein may be employed in various and numerous embodiments without departing from the scope of the teachings herein.

BRIEF DESCRIPTION OF THE DRAWINGS

The accompanying drawings, which are included as part of the present specification, illustrate the presently preferred embodiment of the present invention and together with the general description given above and the detailed description of the preferred embodiment given below serve to explain and teach the principles of the present invention.

DETAILED DESCRIPTION

A method and system for delivering personal media over cable television are disclosed. According to one embodiment, a computer implemented method comprises storing digital content, the digital content including digital photographs, digital video, and music. The digital content is queued for review. A photo show is generated from the digital content. The photo show is transmitted to a cable system for transmission on a video on demand system.

In the following description, for purposes of explanation, specific nomenclature is set forth to provide a thorough understanding of the various inventive concepts disclosed herein. However, it will be apparent to one skilled in the art that these specific details are not required in order to practice the various inventive concepts disclosed herein.

The present invention also relates to apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories, random access memories, EPROMs, EEPROMs, magnetic or optical cards, or any type of media suitable for storing electronic instructions, and each coupled to a computer system bus.

The methods presented herein are not inherently related to any particular computer or other apparatus. Various general-purpose systems may be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

Figure 1:
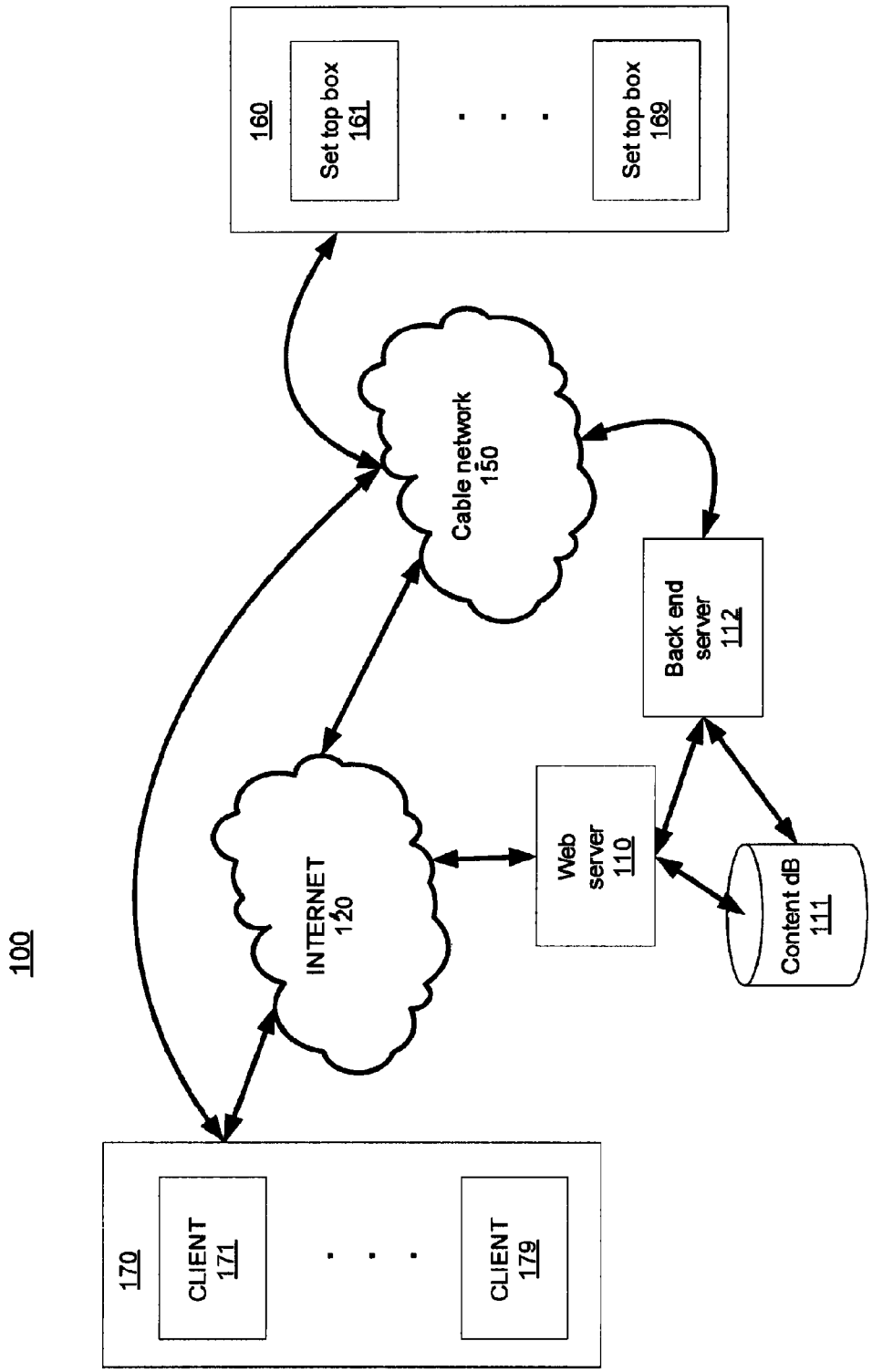
FIG. 1 illustrates a block diagram of an exemplary system for delivering photo shows over a cable network, according to one embodiment.

FIG. 1 illustrates a block diagram of an exemplary system 100 for delivering photo shows over a cable network, according to one embodiment. According to one embodiment, a photo show is a collection of digital photos and videos combined with title credits, captions, transitions, special effects, animations, and a musical soundtrack. Although described with respect to a cable television system, the present system and methods may also be used with wireless systems, Internet, and other similar networks. System 100 includes one or more clients 170 that are connected to a data network, such as Internet 120. According to one embodiment, network 120 is described as being the Internet, alternatively, the network 120 may be a Wide Area Network (WAN), a Local Area Network (LAN), or any other system of interconnections enabling two or more devices to exchange information. Further, the network 120 may include a wireless network, such that one or more of clients 110 or 160 may be wireless devices. Clients 170 may also access the Internet through cable network 150, for example through a cable modem.

Clients 170 are computers through which users upload digital content, including photographs and videos to web server 110. Web server 110 provides an interface for users to provide content and information to be saved in content database 111. The interface may be accessed via a website, or through an application running on a client 170. One or more of clients 170 may allow network access via a web browser such as MICROSOFT'S INTERNET EXPLORER, NETSCAPE BROWSER, MOZILLA, FIREFOX, or the SAFARI browsers that support HTML and JavaScript. Additionally, clients 170 may be mobile devices, such as videophones, laptops, smart phones, mobile phones, PDAs, game devices such as the PSP manufactured by Sony Electronics, multimedia devices such as iPods and iPhones manufactured by Apple Computers of Cupertino, Calif., or similar devices. Clients 170 may also fixed devices such as set top boxes, desktop computers, media recorders such as those manufactured by TiVo, Inc. of Alviso, Calif., game devices such as the XBox manufactured by Microsoft, Corp. of Redmond, Wash. or similar devices.

Web server 110 uses any one of a number of protocols and/or applications including HyperText Transfer Protocol (HTTP), File Transfer Protocol (FTP), Internet Relay Chat (IRC), etc., via a TCP/IP connection (not shown in this view) or other similar connection protocols. The operating system may be Windows®, LINUX, SUN Solaris®, Mac OS, Tiger, or other similar operating system. It uses processing logic, tools and databases and is built using a combination of technologies such as those from Apache Software (www.apache.org) such as Tomcat servers; Java based technologies such as J2EE, EJB, JBOSS, JDBC; and/or databases such as MySQL with content database 111.

Content database 111 stores images such as digital photographs in JPEG format, although other formats are also supported. Metadata files are also stored and maintained in content database 111 in the form of XML files. Video is stored in content database 111 in FLASH VIDEO format, although MPEG is also supported. Music and clipart is stored in FLASH VIDEO format, although other formats are also supported. The contents of content database 111 are used to generate a photo show that is ultimately viewable through cable network 150 via a set top box 160.

Back end server 112 interfaces with web server 110 and content database 111 to process the digital content and information on content database 111 so that it can be provided to cable network 150. Cable network 150 includes a cable television headend that is a master facility for receiving television signals for processing and distribution over cable network 150. The cable TV headend will normally have several large FSS-type television receive-only satellite television dishes for reception of cable/satellite TV networks such as ESPN, CNN, or HBO; a dedicated, non-movable dish is required for each satellite that the cable TV utility wishes to receive cable channels from for distribution over its system. For reception of signals from several adjacent satellites, a larger non-parabolic multi-satellite dish (such as the Torus or Simulsat) that can see up to 3 or more satellites is often used. Many digital cable systems use services like HITS ("Headend In The Sky", a unit of Comcast), which carry hundreds of channels on just a few satellites; this is commonly used by small systems to expand service without adding expensive new dishes or other equipment.

Cable network 150 also includes a video on demand system that allows users to select and watch video content over a network as part of an interactive television system. Video on demand systems either stream content, allowing viewing in real time, or download it in which the program is brought in its entirety to a set-top box 160 before viewing starts. Often, video on demand encompasses a broader spectrum of delivery devices, referring not only to set-top-boxes 160 but also computers 170, mobile phones and indeed any system that can receive on-demand audio-visual content over a network such as cable network 150.

Cable network 150 communicates with set top boxes 160 to deliver photo shows based on the content stored in content database 111. Set-top box 160 is a device that connects to a television and cable network 150, and turns the signals provided by cable network 150 into content then displayed on the screen.

System 100 may also include other supporting computing software and hardware, for example, additional website servers, databases, computers, and user interface servers.

Figure 2:
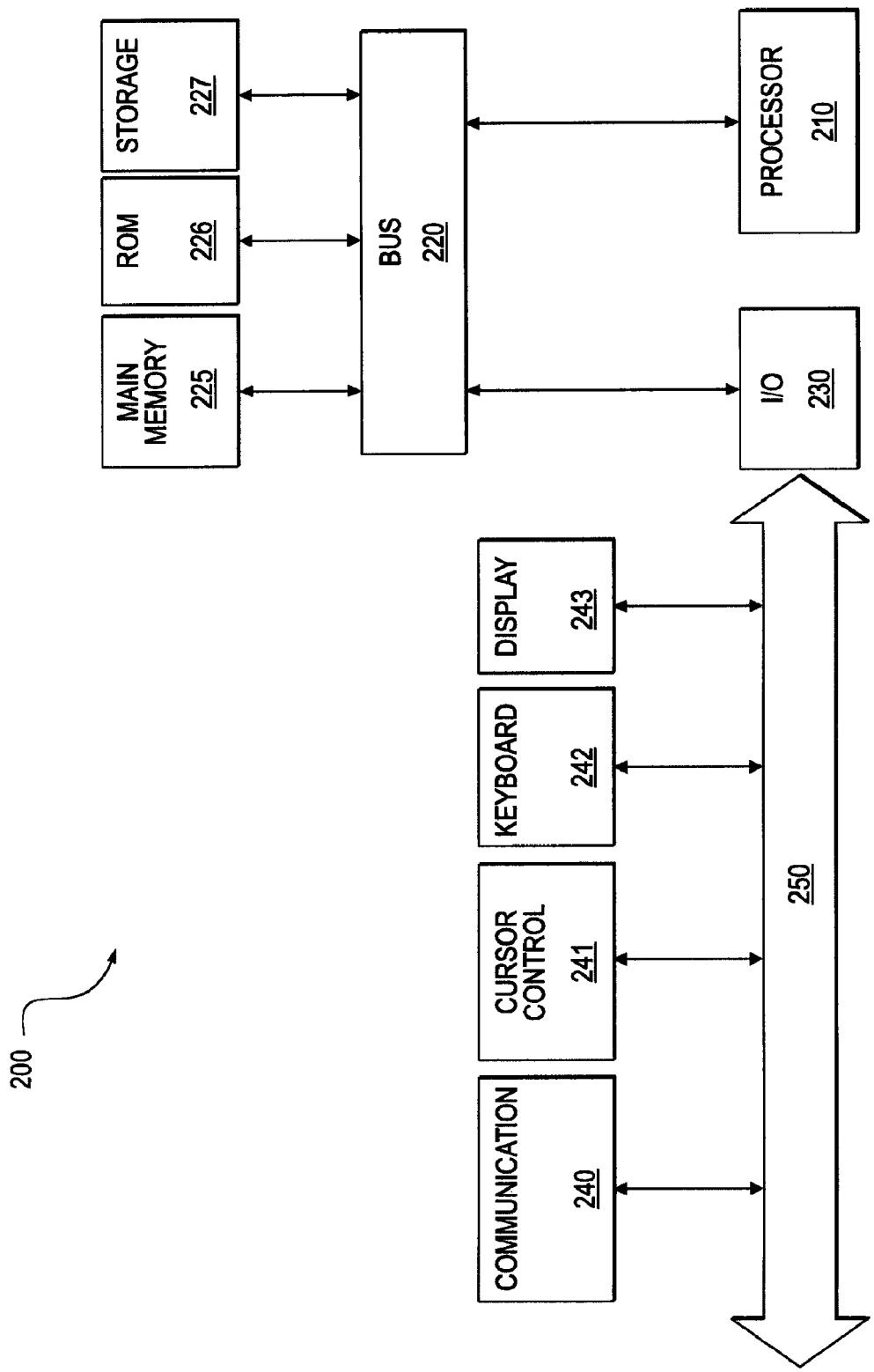
FIG. 2 illustrates an exemplary computer architecture for use with the present system, according to one embodiment.

FIG. 2 illustrates an exemplary computer architecture for use with the present system, according to one embodiment. Computer architecture 200 can be used to implement a client 170, or a server 110 and 112 of FIG. 1. One embodiment of architecture 200 comprises a system bus 220 for communicating information, and a processor 210 coupled to bus 220 for processing information. Architecture 200 further comprises a random access memory (RAM) or other dynamic storage device 225 (referred to herein as main memory), coupled to bus 220 for storing information and instructions to be executed by processor 210. Main memory 225 also may be used for storing temporary variables or other intermediate information during execution of instructions by processor 210. Architecture 200 also may include a read only memory (ROM) and/or other static storage device 226 coupled to bus 220 for storing static information and instructions used by processor 210.

A data storage device 227 such as a magnetic disk or optical disc and its corresponding drive may also be coupled to computer system 200 for storing information and instructions. Architecture 200 can also be coupled to a second I/O bus 250 via an I/O interface 230. A plurality of I/O devices may be coupled to I/O bus 250, including a display device 243, an input device (e.g., an alphanumeric input device 242 and/or a cursor control device 241). For example, web pages rendered by MMSW server 130 and related information may be presented to the user on the display device 243.

The communication device 240 allows for access to other computers (servers or clients) via a network. The communication device 240 may comprise a modem, a network interface card, a wireless network interface or other well known interface device, such as those used for coupling to Ethernet, token ring, or other types of networks.

Figure 3:
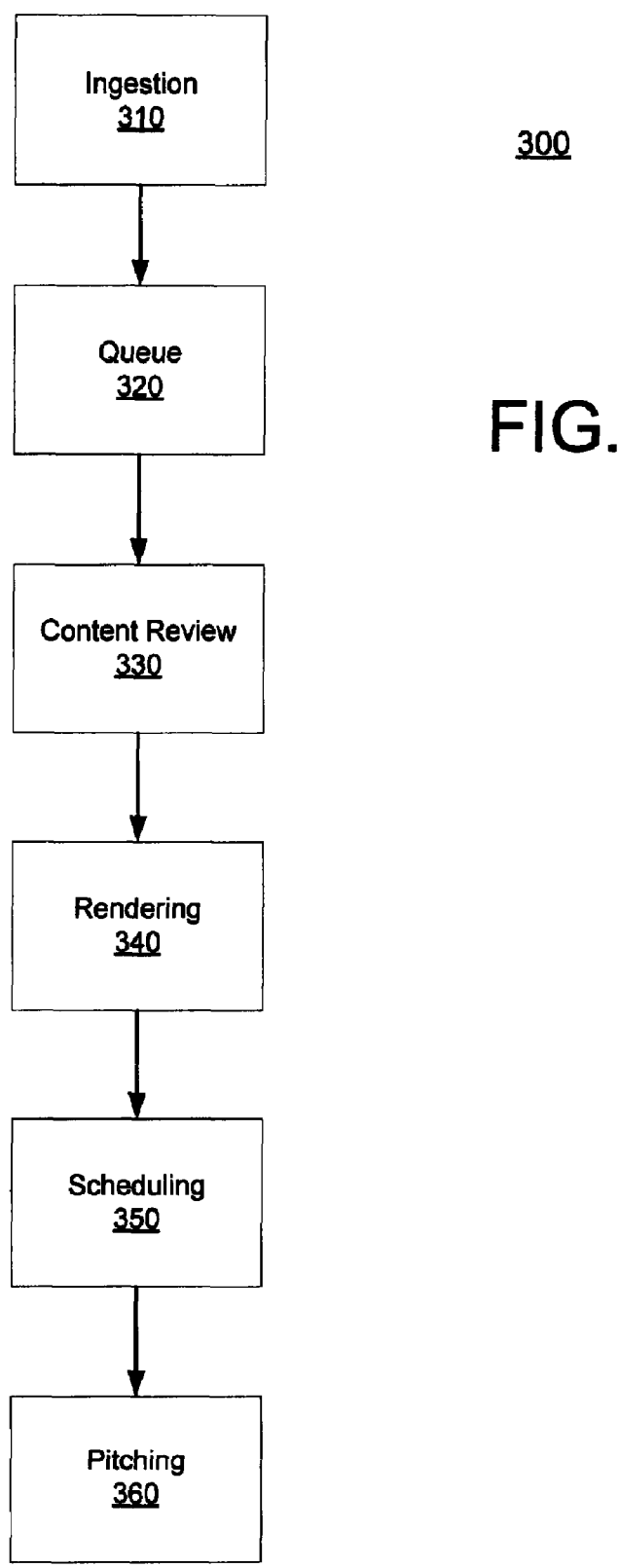
FIG. 3 illustrates a flow diagram of an exemplary process for delivering photo shows over a cable network, according to one embodiment.

FIG. 3 illustrates a flow diagram of an exemplary process 300 for delivering photo shows over a cable network, according to one embodiment. System 100 operates to ingest digital content, including digital photographs and information relating to the desired photo show. (310) The digital content is transferred from clients 170 to the web server 110 via network 120. The digital content is then placed into a queue for review and for rendering. (320) The digital content is reviewed, either through an automated process executing on web server 110 or back end server 112, or through human review through a client 170. (330) The digital content may be reviewed for any criteria, including to filter adult content. If the digital content is not approved, an e-mail notification is generated and automatically sent to the user. If the digital content is approved, then the content is processed for rendering on cable network 150. (340) The content is then assigned a scheduled date and time for broadcast. (350) Finally, the content is transmitted onto the cable network, also referred to as pitching. (360)

Figure 4:
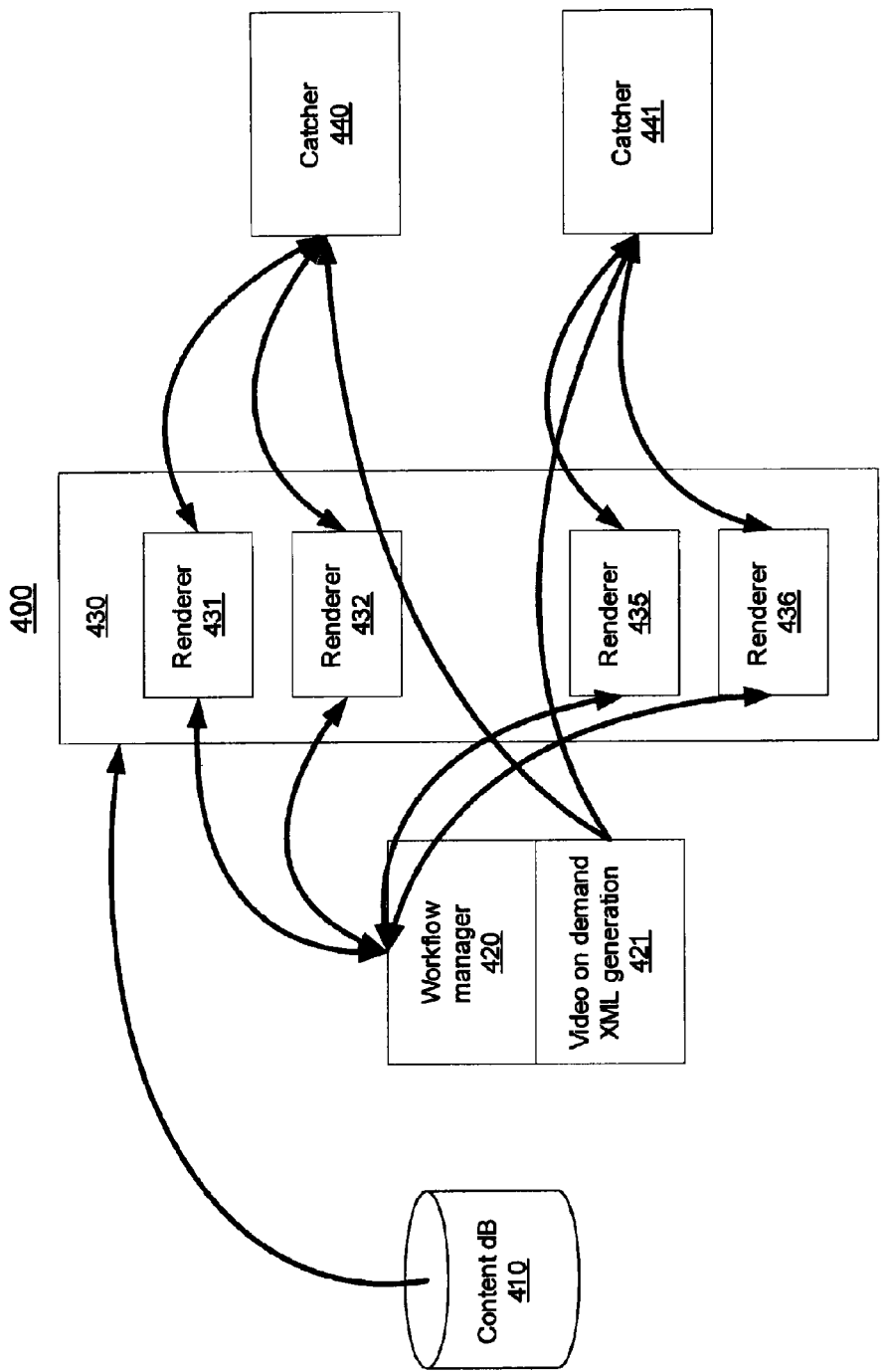
FIG. 4 illustrates a block diagram of an exemplary system for delivering photo shows over a cable network, according to another embodiment.

FIG. 4 illustrates a flow diagram of a block diagram of an exemplary system 400 for delivering photo shows over a cable network, according to another embodiment. System 400 may exist within content database 111, back end server 112 and cable network 150, of FIG. 1. System 400 includes a content database 410, that may be content database 111 according to one embodiment. A bank of renderers 430 transform the content in content database 410 into a photo show. Renderers 430 may be subgrouped to service a particular geographic area or particular cable network 150. For example, renderer 431 may service a cable network located in Hawaii, whereas renderer 435 may service a cable network located in Staten Island.

Renderers 430 are transcoding appliances that include a playback engine. They request instructions (e.g. a metafile) for generating photo shows and execute the instructions to create the photo shows by converting images into a video file (e.g., animation). More particularly, each renderer 430 subscribes to a list of RSS feeds on a particular category of photo shows that it is responsible for processing. The RSS feed is provided by the workflow manager 420 and contains references to the source media and playback instructions (in the form of an XML file) contained in the content database 410. Playback instructions include a manifest of content, music, transitions, special effects, etc. The renderer 430 processes the playback instructions to produce a cable-compatible media file including video and audio. When a renderer 430 finishes processing the playback instructions, it notifies the workflow manager 420, that the photo show is complete. According to one embodiment, generation module 422 transmits to catchers 440, 441 via FTP to a video-on-demand system of cable system 150.

Catchers 440, 441 may be subgrouped to service a particular geographic area or particular cable network 150. For example, catcher 430 may service a cable network located in Hawaii, whereas catcher 431 may service a cable network located in Staten Island. Catchers 440, 441 may be instantiated within cable system 150 as part of a video on demand system.

Workflow manager 420 and video on demand (VOD) XML generation module 421 may be instantiated on back end server 112, according to one embodiment. VOD XML generation module 421 produces a unique VOD XML file for each photo show. The VOD XML file contains VOD metadata providing a title, menu, short and long descriptions, the length of the show in minutes, a rating, a license window (including a start and end date), routing instructions and a location for playing (e.g., Hawaii cable system, Staten Island cable system). According to one embodiment, the VOD XML file is related to an ADI file as defined by Cable Labs.

Workflow manager 420 also provides management functionalities to ensure that operational constraints are followed. The operational constraints are often imposed by the cable network 150. For example, cable network 150 may specify a maximum amount of space for photo shows based on time, data size and/or the number of time slots for playback on the VOD system. In addition, cable network 150 may impose a time window in which all photo shows may be transmitted to the catchers 440, 441 (e.g., 1 a.m. to 5 a.m.). Another constraint may be the times at which the particular photo show may be broadcast on-air (e.g., the number of days the photo show is available on the VOD system).

Once a photo show has been transmitted to catchers 440, 441, the photo show may have one of three states: queued, playing, or complete. As photo shows are continuously being produced and submitted to catchers 440, 441, a process for queuing the flow of photo shows exists. Multiple categories of photo shows are maintained. Each category may have a number of simultaneous photo shows that may be available. Photo shows for each category are queued and staged pending broadcast. A first in first out process may be used where each photo show is guaranteed a minimum amount of time to be available on cable system 150. A gating module controls the transfer of the queued photo shows to the playing state. When the license period of the photo show ends, the cable system 150 automatically terminates the photo show and deletes the content.

Workflow manager 420 also includes a mechanism to extend the license period of a particular photo show, by modifying the XML file accompanying the MPEG file. According to one embodiment, a duplicate photo show is generated with a new XML file that extends the license period.

The author of the photo show is automatically contacted and notified of the date and time when the photo show will be available on the cable system 150.

According to one embodiment, workflow manager 420 includes a roll-up mechanism that aggregates all photo shows in a particular category. In addition, interstitials are inserted between each photo show, where the interstitials may be advertisements or other video content. The roll-up mechanism renders a single photo show and a corresponding XML file with license information.

A method and system for delivering personal media over cable television have been described. It is understood that the embodiments described herein are for the purpose of elucidation and should not be considered limiting the subject matter of the present patent. Various modifications, uses, substitutions, combinations, improvements, methods of productions without departing from the scope or spirit of the present invention would be evident to a person skilled in the art.

We claim:

1. A computer-implemented method for distributing personal digital content over a cable network, comprising:
    storing personal digital content, the personal digital content including digital photographs, digital video, and music received from one or more clients;
    queuing the personal digital content for review and approval based on a criteria; generating a photo show of cable-compatible media file automatically from the personal digital content received from the clients, upon approval of the personal digital content, wherein generating the cable-compatible media file includes,
    receiving instructions from a RSS feed associated with a particular category of photo show, the RSS feed providing playback instructions
    executing the received instructions to create the photo shows by converting images into cable compatible media file including video and audio, the photo show of cable-compatible media file transcoded to identify one of a specific geographic area or a specific cable system within the cable network associated with the photo show for servicing the photo show, wherein the photo show of cable-compatible media file of personal digital content is assigned a schedule date and a time for broadcast over the specific cable system; and
    transmitting the photo show of cable-compatible media file to the specific cable system of the cable network for transmission on a video on demand system to an interactive television system based on the transcoding, the transcoding provides playback instructions for the specific cable system, wherein the transmitting is performed without user request.

2. The computer-implemented method of claim 1, further comprising transmitting an XML file with the photo show to the cable system, wherein the photo show is a video file.

3. The computer-implemented method of claim 2, wherein the XML file includes a title, a menu, a short description, a long description, a length of the photo show, a rating, a license window, routing instructions and a location for playing.

4. The computer-implemented method of claim 3, further comprising displaying the photo show on a television using a set top box.

5. The computer-implemented method of claim 1, further comprising receiving the digital content from a client via the Internet.

6. The computer-implemented method of claim 2, further comprising queuing the photo show for availability on the video on demand system according to one or more constraints, where the one or more constraints include a maximum amount of space for the photo shows based on time, data size and the number of time slots for playback on the video on demand system.

7. The computer-implemented method of claim 2, further comprising queuing the photo show for availability on the video on demand system according to one or more constraints, where the one or more constraints include a time window in which the photo show may be transmitted to the cable system.

8. The computer-implemented method of claim 2, further comprising queuing the photo show for availability on the video on demand system according to one or more constraints, where the one or more constraints include a time window when the photo show is available for viewing on the video on demand system.

9. The computer-implemented method of claim 2, further comprising automatically generating email notifications to a user that provided the digital content.

10. The computer-implemented method of claim 2, further comprising extending a time window when the photo show is available,
   generating a duplicate photo show of the generated photo show;
   generating a second XML file for the duplicate photo show for the specific cable system, the second XML file extending a license period of the photo show for the specific cable system; and
   transmitting the duplicate photo show with the second XML file to the specific cable system for transmission on the video on demand system.

11. The computer-implemented method of claim 2, further comprising generating a second photo show from two or more photo shows belong to a common category.

12. The computer-implemented method of claim 11, further includes inserting one or more interstitials between the photo show, wherein the interstitials include any one or both of advertisements or other digital content.

* * * * *